United States Patent [19]

Bowen et al.

[11] Patent Number: 5,016,966
[45] Date of Patent: May 21, 1991

[54] ASYMMETIC OPTICAL FIBER TAP

[75] Inventors: Terry P. Bowen, Etters, Pa.; John R. Rowlette, Clemmons, N.C.

[73] Assignee: AMP Incorporated, Harrisburg, Pa.

[21] Appl. No.: 508,745

[22] Filed: Apr. 12, 1990

[51] Int. Cl.$^5$ .............................. G02B 6/34; G02B 5/32
[52] U.S. Cl. .............................. 350/96.19; 350/96.20; 350/3.7
[58] Field of Search ............... 350/96.15, 96.16, 96.18, 350/96.19, 96.20, 96.21, 96.22, 3.7, 3.72, 3.73, 3.83

[56] References Cited

U.S. PATENT DOCUMENTS

| | | | |
|---|---|---|---|
| 3,975,082 | 8/1976 | Winzer | 350/96.19 |
| 4,057,319 | 11/1977 | Ash et al. | 350/96.19 X |
| 4,428,643 | 1/1984 | Kay | 350/3.71 |
| 4,465,332 | 8/1984 | Horner et al. | 350/96.19 |
| 4,802,723 | 2/1989 | Miller | 350/96.15 |
| 4,907,851 | 3/1990 | Marhic | 350/96.19 |
| 4,946,253 | 8/1990 | Kostuck | 350/169 |

OTHER PUBLICATIONS

"Miniature Optics for Optical Recording", Glenn T. Sincerbox, SPIE, vol. 935, Gradient-Index Optics and Miniature Optics, (1988), pp. 63-76.
"Hybrid Diffractive-Refractive Lenses and Achromats", T. Stone and N. George, Applied Optics, vol. 27, No. 14, Jul. 15, 1988, pp. 2960-2971.
"Holographic Optical Head for Compact Disk Applications", W. Lee, Optical Engineering, vol. 28, No. 6, Jun. 1989, pp. 650-653.
"Diffractice Optical Elements for Use in Infrared Systems", G. Swanson and W. Veldkamp, Optical Engineering, vol. 28, No. 6, Jun. 1989, pp. 605-608.

Primary Examiner—Brian Healy

[57] ABSTRACT

An asymmetric optical fiber for tap optically coupling an ingoing fiber, an outgoing fiber, a tap fiber and optionally an optical source fiber, includes a housing, and at least one wavelength compensated holographic optical element (HOE) disposed in the housing. The housing includes first, second and third guides therein for guiding the ingoing fiber, and the outgoing fiber, and the tap fiber, and optinally a fourth guide means for guiding the optical source fiber, respectively, adjacent to the HOE. The HOE is adapted to couple optical energy from the ingoing fiber to both the outgoing and tap fiber, and to launch optical energy from the optical source fiber to the ingoing fiber. The disclosed taps are simple in design, easy to manufacture and connect, and cause minimal attenuation of the ongoing optical signal. The taps are also compact; optical fiber alignment is facilitated and they allow for an optical signal to be efficiently launched in an uphill direction into the ingoing fiber.

51 Claims, 2 Drawing Sheets

ASYMMETIC OPTICAL FIBER TAP

FIELD OF THE INVENTION

The present invention relates to optical fiber communications. More particularly, it relates to a device for asymmetrically tapping a small portion of optical energy from an optical fiber and for efficiently launching an optical signal into the same fiber.

BACKGROUND OF THE INVENTION

Optical fiber taps have been increasingly used in optical communication networks such as local area networks to interconnect various computer terminals, printers and/or instruments. As is well known to those skilled in the art, an asymmetric optical fiber tap allows an "ongoing" optical signal to propagate therethrough in a "downhill" direction, from an "ingoing" fiber to an "outgoing" fiber, while tapping a small portion of the optical signal for receipt at a terminal or other device connected to the tap. It also allows for an efficient launch of an optical signal into the ingoing fiber in the "uphill" direction. Optical communications systems require taps that are simple in design, easy to connect, cause minimal loss of optical energy to the ongoing signal propagating through the tap, and do not subject the fibers to disruptive forces.

U.S. Pat. No. 4,802,723 to Miller discloses an optical fiber tap formed by bending an optical fiber and substantially surrounding a portion of the fiber with a tube which couples the tapped optical energy to a detector. However, the disclosed optical fiber taps require bending of the fiber which may ultimately damage the fiber. Therefore, they can be difficult to manufacture and tend not to be very durable. Further, they do not provide for the efficient launching of optical energy in the uphill direction into the ingoing optical fiber.

SUMMARY OF THE INVENTION

It is therefore an object of the present invention to provide a high performance asymmetric optical fiber tap.

It is another object of the present invention to provide an asymmetric optical fiber tap that is simple in design, easy to manufacture, compact and that does not subject an optical fiber to potentially destructive bending forces.

It is yet another object of the present invention to provide an asymmetric optical fiber tap which causes minimal insertion loss or degradation of the ongoing optical fiber signal.

It is a further object of the present invention to provide an asymmetric optical fiber tap which can efficiently launch transmit optical energy into the same ingoing optical fiber in the uphill direction.

These and other objects which will become apparent to persons of ordinary skill in the art are accomplished by providing an asymmetric fiber optic tap for optically coupling an ingoing fiber, an outgoing fiber and a tap, including a housing and at least one wavelength compensated holographic optical element (HOE) in the housing. In a first embodiment, the housing has first, second and third guides disposed therein, which are adapted for guiding the inserted end of an ingoing fiber, an outgoing fiber and a tap fiber, respectively, adjacent the HOE. One or more optical spacers may be used to position the ends of the fibers relative to the HOE. The HOE is adapted to couple optical energy from the ingoing fiber to both the outgoing fiber and the tap fiber. The HOE may couple optical energy in transmissive and/or reflective modes. The HOE employed in the present invention also compensates for small shifts in wavelength of the ingoing signal and the local fiber optic source, i.e., it is wavelength compensated.

In particular, in another embodiment, a transmissive mode asymmetric fiber optic tap includes a housing having disposed therein first, second, third and fourth guides, a wavelength compensated HOE and two optical spacers disposed on opposite sides of the HOE. The first and second guides are disposed within the housing so as to align an inserted end of each of the ingoing and outgoing fiber, respectively, adjacent to and substantially perpendicular to the first optical spacer and substantially parallel to each other. The third and fourth guides are aligned adjacent to the second optical spacer and are adapted to guide the inserted end of the tap fiber and the optical source fiber, respectively, adjacent to and substantially perpendicular to the second optical spacer and substantially parallel to each other.

A photodetector and an optical source may be coupled to the opposite end of the tap fiber and the optical source fiber, respectively, outside the housing. The HOE is adapted to reflectively couple optical energy of various wavelengths from the ingoing fiber in the first guide to the outgoing fiber in the second guide and to transmissively couple optical energy of various wavelengths from the ingoing fiber to the tap fiber in the third guide. Generally, the HOE is designed to couple most, e.g. 95%, of the energy from the ingoing fiber to the outgoing fiber and to couple a small amount, e.g. 5%, of the energy to the tap fiber. The HOE is further adapted to transmissively couple optical energy from the optical source fiber in the fourth guide to the ingoing fiber in the uphill direction, or in the alternative, a second HOE can be provided to perform this function.

In another alternative embodiment of the present invention, a reflective mode asymmetric fiber optic tap is formed when all guides are disposed on the same side of the HOE and all optical energy is reflectively coupled.

In yet another alternate embodiment of the present invention, a reflective mode asymmetric fiber optic tap includes a photodetector such as a pin photo diode, and/or an optical source such as a laser diode or LED, and is disposed directly within the housing adjacent the HOE with no intervening fibers. The photodetector and optical source alternatively may be positioned on the opposite side of the HOE as the first and second guide means to form a transmissive mode asymmetric fiber optic tap, or may be positioned adjacent the same side of the HOE as the first and second guide means to form a reflective mode asymmetric fiber optic tap. The photodetector converts received optical energy into an electrical signal, and the optical source converts an electrical signal into an optical signal for uphill launch. An attached terminal or other device may thereby communicate with others via the tap using electrical rather than optical signals.

The asymmetric fiber optic taps of the present invention are simple in design, easy to manufacture and compact. They do not subject the optical fibers to any destructive bending forces because the unique optical coupling capabilities of the HOE facilitate straight alignment and end face optical coupling of the various optical fibers. In addition, the taps cause substantially minimal insertion loss, and substantially no disruption or degradation of the ongoing optical signal. Further, they provide for efficient transmissive or reflective launching of optical energy to an ingoing fiber in the uphill direction.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art.

Figure 1:
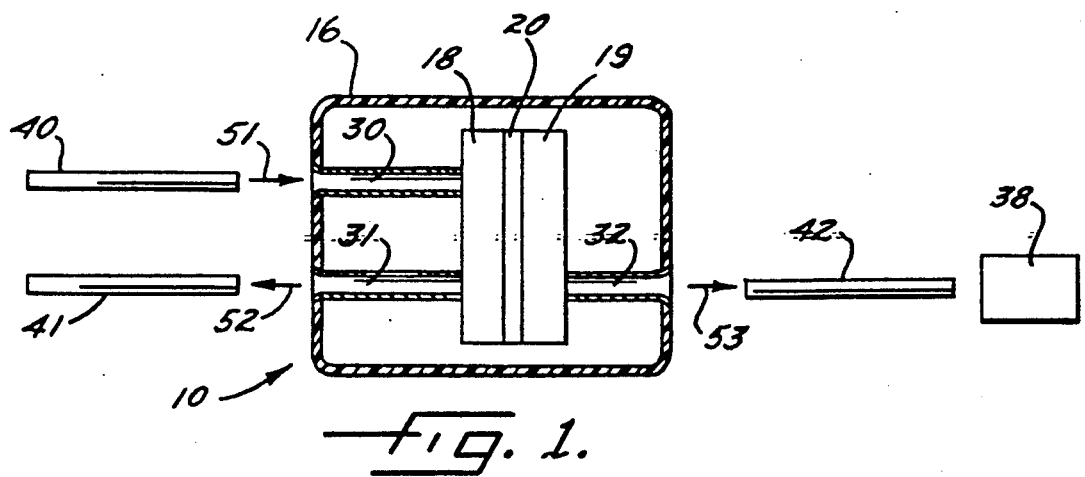
FIGS. 1 and 3 are cross-sectional views of a first embodiment of the asymmetric fiber optic tap receiver of the present invention in transmissive mode and reflective mode, respectively.

Referring now to FIG. 1, transmissive mode asymmetric fiber optic tap receiver 10 comprises housing 16 having enclosed therein holographic optical element (HOE) 20 disposed between optical spacers Is and 19 Which provide a predetermined spacing between the ends of the optical fibers and the HOE. Disposed within the housing are first, second and third guides 30, 31 and 32. Guides 30 and 31 are adapted to guide an end of an ingoing optical fiber 40 and an outgoing optical fiber 41, respectively, adjacent optical spacer 18. Guide 32 is adapted to guide the inserted end of tap optical fiber 42 adjacent optical spacer 19. The guides may be open-ended channels, one end of which is adapted to receive an end of an optical fiber and the other open end of which is disposed adjacent an optical spacer such that when an optical fiber is inserted into the guide, the end of the fiber can physically contact the optical spacer surface at a specific distance from the HOE. It will be understood by those having skill in the art that with an alternate embodiment of the HOE 20, an optical spacer need not be used, and the end of the optical fiber may be disposed adjacent to and touching the alternate HOE. Alternatively, the guides 30-32 may be shaped to maintain the end of a fiber at a predetermined distance from the HOE, for example by providing a protrusion in the guide at the predetermined distance. The guides may be separate elements that are inserted into the housing, or in the alternative, the housing can be constructed so as to have the guides integral therewith.

Guides 30 and 31 are aligned further such that when the ingoing fiber and the outgoing fiber respectively, are inserted therein, at least the inserted ends of the fibers are substantially parallel to each other, and are substantially perpendicular to and adjacent optical spacer 18 and the HOE 20. Optical energy propagating from the ingoing fiber 40 is reflectively coupled via optical spacer 18 by HOE 20 to outgoing fiber 41 as shown by arrows 51 and 52. Guide 32 is adapted similarly such that when tap fiber 42 is inserted therein, the inserted end may physically contact optical spacer 19 disposed adjacent the opposite side of HOE 20. Optical energy is tapped from ingoing fiber 40 and transmissively coupled by HOE 20 via optical spacer 19 to tap fiber 42 in the direction of arrow 53. Tap fiber 42 may be connected to a photodetector 38 disposed outside the housing 16 where the optical energy is converted to electrical energy.

HOE 20 is designed to tap or couple a very small amount of optical energy propagating in the ingoing fiber 40 to tap fiber 42 with very low attenuation or degradation of the propagating optical signal. For example, the amount of optical energy tapped by the optical coupling of HOE 20 can range from less than 1% to about 50%. This also allows for a plurality of taps to be disposed in an optical communications network wherein adequate optical energy is available for each tap. Further, each tap causes minimal insertion loss when reflectively coupling ingoing fiber 40 to outgoing fiber 41.

Figure 2:
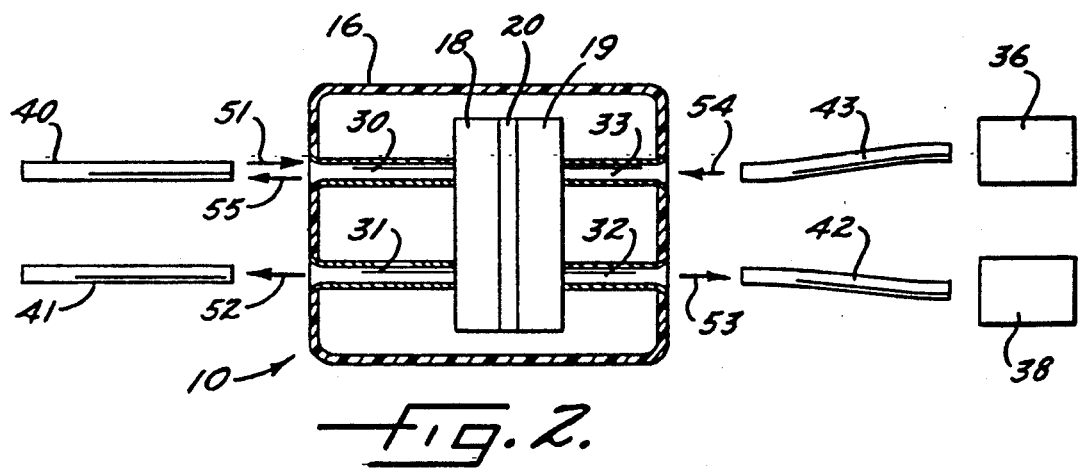
FIGS. 2 and 5 are cross-sectional views of a second embodiment according to the present invention.

As illustrated in FIG. 2, asymmetric fiber optic tap 10 may further comprise fourth guide means 33, constructed similarly to guides 30, 31 and 32, and which is adapted to receive an end of optical source fiber 43 and to dispose that end of the fiber such that it physically contacts the optical spacer 19. Optical source 36, disposed outside the housing, converts electrical energy into optical energy which propagates through source fiber 43 in the direction shown by arrow 54, and is transmissively coupled in the uphill direction to ingoing fiber 40 by HOE 20 via optical spacers 18 and 19 in the opposite direction of the downhill signal as shown by arrow 55. The wavelength or polarization of light propagated in this manner may be different from the wavelength or polarization of light propagating in the downhill direction to facilitate separation of uphill and downhill optical signals. For example, downhill wavelengths may range from about 1200 nm to 1500 nm, and uphill wavelengths may range from 600 nm to 1500 nm.

Figure 3:
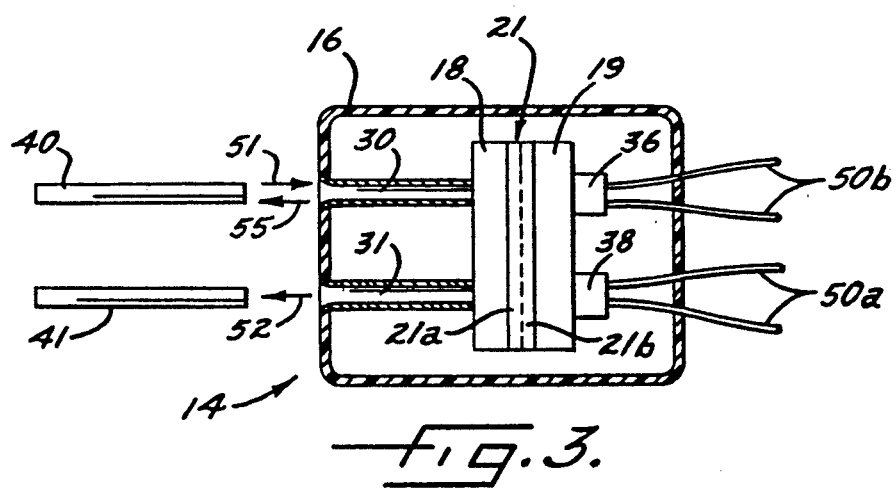

Another variation of the first embodiment according to the present invention is illustrated in FIG. 3. Asymmetric fiber optic tap 14 comprises photodetector 38 and optical source 36 both disposed within housing 16 and in physical contact with optical spacer 19. When ingoing optical fiber 40 and outgoing optical fiber 41 are disposed in guides 30 and 31, respectively, HOE 21 reflectively couples optical energy from fiber 40 to fiber 41. HOE 21 also transmissively couples a small amount of optical energy from fiber 40 to photodetector 38 whereupon the optical energy is converted into electrical energy which is transmitted to the external environment along wires 50a. HOE 21 is also adapted to transmissively couple (launch) optical energy from optical source 36 to fiber 40 so as to have the light propagating in an opposite direction of the ingoing signal as shown by arrow 55. Optical source 36 transforms electrical energy transmitted from wires 50b into optical energy. Thus, the third and fourth guides, a tap fiber and the optical source fiber are not required. It will be understood by those having skill in the art that an asymmetric fiber optic tap according to this embodiment may include in the housing a photodetector 38 but no optical source 36, or may include an optical source but no photodetector. In the latter case, a guide for a tap fiber and a tap fiber may be provided for tapping optical energy; whereas in the former case, a guide for an optical source fiber and the optical source fiber may be included for launching optical energy.

A single HOE can perform the function of more than one conventional reflective or refractive element. A HOE can be prepared by using basic optical apparatus such as small lenses, mirrors, a light source and a beam splitter. See, for example, Chapters 13-14 in Kasper et al, *The Complete Book Of Holograms; How They Work And How to Make Them*, Wiley & Sons, New York (1987). HOE's can be designed by computer, and prepared by E-beam lithography. See, for example, Swansen et al, *Optical Engineering*, "Diffractive Optical Elements For Use In Infrared Systems," 28(6):605-08 (1989). The HOE's of the present invention are wavelength compensated; they are designed to eliminate additional coupling loss due to optical source wavelength shifts. This is achieved by methods known in the art as described, for example, in Sincerbox, *SPIE*, "Miniature Optics For Optical Recording," 935:63-76, 72 (1988).

The functions performed by the HOE of the present invention alternatively may be performed by a plurality of HOE's in combination. Thus, referring again to FIG. 3, multi-functional HOE 21 may be replaced by HOE 21a and HOE 21b. HOE 21a reflectively couples optical energy from ingoing fiber 40 to outgoing fiber 41 and taps optical energy from ingoing fiber 40 and transmissively couples it to photodetector 38. HOE 21b transmissively couples (launches) optical energy from optical source 36 to ingoing fiber 40 wherein the coupled energy propagates in the uphill direction shown by arrow 55. In addition, HOEs 21a and 21b may be optimized for light of different wavelengths; for example, HOE 21a will be optimized for a wavelength of about 1300 nm, and HOE 21b at a wavelength of about 780 nm or 850 nm.

The optical spacers protect the HOE and maintain the end of the fibers at a predetermined distance from the HOE. They are usually made of glass, or other suitable transparent material. An index matching, optically transparent adhesive is used to bond the optical spacer to the HOE. It will be understood by those having skill in the art that the optical spacers need not have uniform thickness as shown in FIGS. 1-6. Rather, the thickness of the spacers may vary to space each fiber at a desired distance from the HOE.

Figure 4:
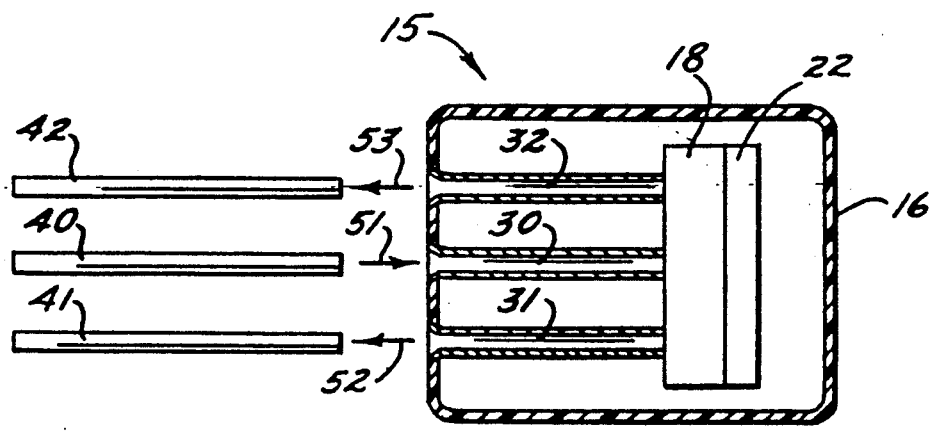
FIGS. 4 and 6 are cross-sectional views of a third embodiment according to the present invention.
Figure 5:
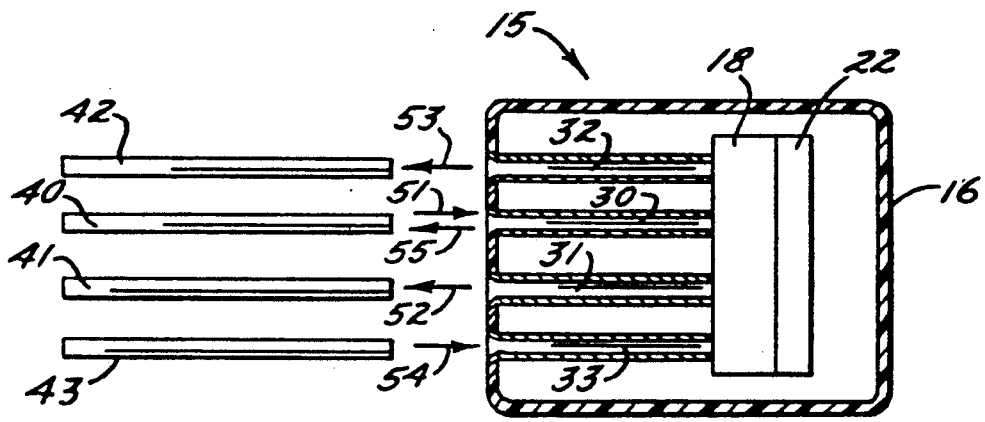
Figure 6:
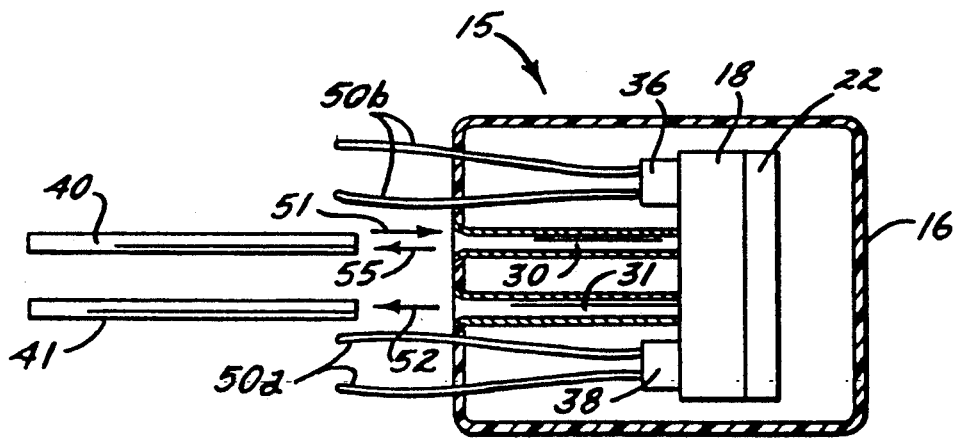

Reflective mode embodiments according to the present invention is illustrated in FIGS. 4-6. Asymmetric fiber optic tap 15 comprises HOE 22a which couples all optical energy reflectively. In FIG. 4, each guide means 30, 31 and 32 is disposed in housing 16 such that the inserted ends of ingoing fiber 40, outgoing fiber 41 and tap fiber 42, respectively, physically contact the surface of optical spacer 18 at a specific distance from the HOE. Optical energy propagating in the ingoing fiber 40 is reflectively coupled to outgoing fiber 41 as shown by arrows 51 and 52. A small amount of energy is also reflectively coupled to tap fiber 42 as shown by arrow 53.

The asymmetric fiber optic tap illustrated in FIG. 5 further comprises guide 33 also disposed relative to optical spacer 18 as described above such that the inserted end of optical source fiber 43 can physically contact the same surface of optical spacer 18 contacted by fibers 40, 41 and 42. Optical energy propagating along optical source fiber 43 is reflectively coupled to ingoing fiber 40 in the uphill direction by HOE 22a via optical spacer 18 as shown by arrows 54 and 55.

Turning now to the variation illustrated in FIG. 6, optical source 36 and photodetector 38 are disposed within the housing 16 such as to physically contact the same surface of optical spacer 18 as guide means 30 and 31. HOE 22 reflectively couples (1) optical energy from ingoing fiber 40 to outgoing fiber 41 as shown by arrows 51 and 52; (2) a small amount of optical energy from ingoing fiber 40 to photodetector 38; and (3) optical energy produced from optical source 36 to ingoing fiber 40 in the uphill direction shown by arrow 55. As can be seen, the use of a totally reflective HOE eliminates the need for a second optical spacer.

The asymmetric fiber optic taps according to the present invention are simple in design, easy to manufacture and compact due to the multi-functional HOE. They are also durable because the fibers are not subjected to potentially disruptive forces such as bending. Further, they are optically efficient because they cause minimal insertion loss or attenuation of the ongoing optical signal. They represent a further improvement over the prior art because they allow for an efficient launch of an uphill optical signal to be achieved as well as compensating for shifts in wavelength of the uphill or local optical sources.

It is understood that the above-described embodiments are merely illustrative of the application of the principles of this invention. Numerous other embodiments may become apparent or be devised by those skilled in the art without departing from the spirit and scope of the invention, as defined by the claims hereinbelow.

What is claimed is:

1. An asymmetric fiber optic tap for optically coupling an ingoing fiber, an outgoing fiber and a tap fiber, comprising:
   a housing;
   at least one wavelength compensated holographic optical element (HOE) in said housing;
   said housing having first, second and third guide means therein, said first, second and third guide means being adapted to guide the ingoing fiber, the outgoing fiber and the tap fiber, respectively, to said at least one HOE;
   said at least one HOE being adapted to reflectively couple optical energy from said first guide means to said second guide means, and to transmissively coupled optical energy from said first guide means to said third guide means.

2. The asymmetric fiber optic tap of claim 1, further comprising first and second optical spacers disposed in said housing, adjacent to and on opposite sides of said at least one HOE, and wherein said first and second guide means are adapted for guiding said ingoing and said outgoing fiber, respectively, adjacent to said first optical spacer, and wherein said third guide means is adapted for guiding said tap fiber adjacent to said second optical spacer, said first and second optical spacers being selected to maintain the ends of the ingoing and outgoing fibers and the tap fibers respectively, at predetermined distances from said at least one HOE.

3. The asymmetric fiber optic tap of claim 2, wherein said housing further comprises fourth guide means therein, said fourth guide means being adapted for guiding an optical source fiber adjacent said second optical spacer; and wherein said at least one HOE is further adapted to couple optical energy from said fourth guide means to said first guide means.

4. The asymmetric fiber optic tap of claim 2, in combination with an ingoing fiber, an outgoing fiber and a tap fiber disposed in said first, second and third guide means, respectively.

5. The asymmetric fiber optic tap of claim 3, in combination with an ingoing fiber, an outgoing fiber, a tap fiber and an optical source fiber disposed in said first, second, third and fourth guide means, respectively.

6. An asymmetric fiber optic tap for optically coupling an ingoing fiber, an outgoing fiber and a tap fiber, comprising:
  a housing;
  at least one wavelength compensated holographic optical element (HOE) in said housing;
  said housing having first, second and third guide means therein, said first, second and third guide means being adapted to guide the ingoing fiber, the outgoing fiber and the tap fiber, respectively, to said at least one HOE;
  said at least one HOE being adapted to optically couple most of the optical energy from said first guide means to said second guide means, and to couple a small portion of said optical energy to said third guide means.

7. The asymmetric fiber optic tap of claim 6, wherein said at least one HOE is adapted to optically couple at least 95% of the optical energy from said first guide means to said second guide means, and to couple 5% or less of said optical energy to said third guide means.

8. The fiber optic tap receiver of claim 1, further comprising a first optical spacer in said housing adjacent to said HOE, and wherein said first, second and third guide means are adapted for guiding the ingoing, the outgoing and the tap fiber, respectively, adjacent to said first optical spacer, said first optical spacer being selected to maintain the ends of the ingoing, outgoing and tap fibers at predetermined distances from said HOE.

9. The asymmetric fiber optic tap of claim 8, wherein said housing further includes a fourth guide means therein, said fourth guide means being adapted for guiding an optical source fiber adjacent said optical spacer; and wherein said at least one HOE is further adapted to reflectively couple optical energy from said fourth guide means to said first guide means.

10. The asymmetric fiber optic tap of claim 8, in combination with an ingoing fiber, an outgoing fiber and a tap fiber disposed in said first, second and third guide means, respectively.

11. The asymmetric fiber optic tap of claim 9, in combination with an ingoing fiber, an outgoing fiber, a tap fiber and an optical source fiber disposed in said first, second, third and fourth guide means, respectively.

12. The asymmetric fiber optic tap of claim 1, wherein the coupling of said optical energy from said first guide means to said second guide means is by one of transmission and reflection, and the coupling of said optical energy from said first guide means to said third guide means is by one of transmission and reflection.

13. An asymmetric fiber optic tap for optically coupling an ingoing fiber, an outgoing fiber and a tap fiber, comprising:
  a housing;
  at least one wavelength compensated holographic optical element (HOE) in said housing;
  said housing having first, second, third and fourth guide means therein, said first, second and third guide means being adapted to guide the ingoing fiber, the outgoing fiber and the tap fiber, respectively, to said at least one HOE; and
  said fourth guide means being adapted for guiding an optical source fiber to said at least one HOE; wherein said at least one HOE is further adapted to couple energy from said fourth guide means to said first guide means by one of transmission and reflection;
  said at least one HOE being adapted to couple optical energy from said first guide means to both said second and third guide means.

14. The asymmetric fiber optic tap of claim 3, wherein said at least one HOE is adapted to couple optical energy of a first wavelength from said first guide means to both said second and third guide means, and to couple optical energy of a second wavelength from said fourth guide means to said first guide means.

15. The asymmetric fiber optic tap of claim 9, wherein said at least one HOE is adapted to couple optical energy of a first wavelength from said first guide means to both said second and third guide means, and to couple optical energy of a second wavelength from said fourth guide means to said first guide means.

16. The asymmetric fiber optic tap of claim 13, wherein said at least one HOE is adapted to couple optical energy of a first wavelength from said first guide means to both said second and third guide means, and to couple optical energy of a second wavelength from said fourth guide means to said first guide means.

17. An asymmetric fiber optic tap for optically coupling an ingoing fiber and an outgoing fiber, comprising:
  a housing;
  at least one wavelength compensated holographic optical element (HOE) in said housing; and
  a photodetector disposed in said housing adjacent to said at least one HOE;
  said housing having first and second guide means adapted for guiding the ingoing fiber and the outgoing fiber, respectively, to said at least one HOE;
  said at least one HOE being adapted to couple optical energy from said first guide means to said second guide means and to said photodetector.

18. The asymmetric fiber optic tap of claim 17, wherein said at least one HOE is adapted to reflectively couple optical energy from said first guide means to said second guide means, and to transmissively couple optical energy from said first guide means to said photodetector.

19. The asymmetric fiber optic tap of claim 18, further comprising first and second optical spacers disposed in said housing, adjacent to and on opposite sides of said at least one HOE, and wherein said first and second guide means are adapted for guiding said ingoing and said outgoing fibers, respectively, adjacent to said first optical spacer, and wherein said photodetector is disposed adjacent to said second optical spacer, said first and second optical spacers being selected to maintain the ends of the ingoing and outgoing fibers, and said photodetector, respectively, at predetermined distances from said at least one HOE.

20. The asymmetric fiber optic tap of claim 19, wherein said housing further comprises an optical source disposed adjacent to said at least one HOE and wherein said at least one HOE is further adapted to couple optical energy from said optical source to said first guide means.

21. The asymmetric fiber optic tap of claim 19, in combination with an ingoing fiber and an outgoing fiber disposed in said first and second guide means, respectively.

22. The asymmetric fiber optic tap of claim 20, in combination with an ingoing fiber and an outgoing fiber disposed in said first and second guide means, respectively.

23. The asymmetric fiber optic tap of claim 17, wherein said at least one HOE is adapted to optically couple most of the optical energy from said first guide means to said second guide means, and to couple a small portion of said optical energy to said photodetector.

24. The asymmetric fiber optic tap of claim 23, wherein said at least one HOE is adapted to optically couple at least 95% of said optical energy from said first guide means to said second guide means, and to couple 5% or less of said optical energy to said photodetector.

25. The asymmetric fiber optic tap of claim 17, wherein said at least one HOE is adapted to reflectively couple optical energy from first guide means to said second guide means, and to reflectively couple optical energy from said first guide means to said photodetector.

26. The asymmetric fiber optic tap of claim 25, comprising an optical spacer disposed in said housing and adjacent to said at least one HOE, and wherein said first guide means, said second guide means and said photodetector are disposed adjacent to said optical spacer, and wherein said optical spacer is selected to maintain the ends of the ingoing fiber, the outgoing fiber and said photodetector at predetermined distances from said at least one HOE.

27. The asymmetric fiber optic tap of claim 26, wherein said housing further comprises an optical source disposed adjacent to said optical spacer, and wherein said at least one HOE is further adapted to reflectively couple optical energy from said optical source to said first guide means.

28. The asymmetric fiber optic tap of claim 26, in combination with an ingoing fiber and an outgoing fiber disposed in said first and second guide means, respectively.

29. The asymmetric fiber optic tap of claim 27, in combination with an ingoing and an outgoing fiber disposed in said first and second guide means, respectively.

30. The asymmetric fiber optic tap of claim 17 wherein said at least one HOE is adapted to couple optical energy from said first guide means to said second guide means by one of transmission and reflection and wherein said at least one HOE is adapted to couple optical energy from said first guide means to said photodetector by one of transmission and reflection.

31. The asymmetric fiber optic tap of claim 17, wherein said housing further comprises an optical source adjacent to said at least one HOE; and wherein said at least one HOE is further adapted to couple optical energy from said optical source to said first guide means.

32. The asymmetric fiber optic tap of claim 20, wherein said at least one HOE is further adapted to couple optical energy of a first wavelength from said first guide means to both said second guide means and said photodetector, and to couple optical energy of a second wavelength from said optical source to said first guide means.

33. The asymmetric fiber optic tap of claim 27, wherein said at least one HOE is further adapted to couple optical energy of a first wavelength from said first guide means to both said second guide means and said photodetector, and to couple optical energy of a second wavelength from said optical source to said first guide means.

34. The asymmetric fiber optic tap of claim 31, wherein said at least one HOE is further adapted to couple optical energy of a first wavelength from said first guide means to both said second guide means and said photodetector, and to couple optical energy of a second wavelength from said optical source to said first guide means.

35. An asymmetric fiber optic tap for optically coupling an ingoing fiber and an outgoing fiber, comprising;
a housing;
at least one wavelength compensated holographic optical element (HOE) in said housing; and
an optical source disposed in said housing adjacent to said at least one HOE;
said housing having first and second guide means therein adapted for guiding the ingoing optical fiber and the outgoing optical fiber, respectively, adjacent to said at least one HOE;
said at least one HOE being adapted to couple optical energy from said first guide means to said second guide means and from said optical source to said first guide means.

36. The asymmetric fiber optic tap of claim 35, wherein said at least one HOE is adapted to reflectively couple optical energy from said first guide means to said second guide means, and to transmissively couple optical energy from said optical source to said first guide means.

37. The asymmetric fiber optic tap of claim 36, further comprising first and second optical spacers disposed in said housing, adjacent to and on opposite sides of said at least one HOE, and wherein said first and second guide means are adapted for guiding an end of an ingoing and an outgoing fiber, respectively, adjacent to said first optical spacer, and wherein said optical source is disposed adjacent to said second optical spacer, said first and second optical spacers being selected to maintain the ends of the ingoing and outgoing fibers and said optical source at predetermined distances from said at least one HOE.

38. The asymmetric fiber optic tap of claim 37, wherein said housing further comprises third guide means therein, said third guide means being adapted for guiding an optical tap fiber adjacent to said second optical spacer; and wherein said at least one HOE is further adapted to couple optical energy from said first guide means to said third guide means.

39. The asymmetric fiber optic tap of claim 37, in combination with an ingoing fiber, and an outgoing fiber disposed in said first and second guide means, respectively.

40. The asymmetric fiber optic tap of claim 38, in combination with an ingoing fiber, an outgoing fiber, and a tap fiber disposed in said first, second and third guide means, respectively.

41. The asymmetric fiber optic tap of claim 38, wherein said at least one HOE is adapted to optically couple most of the optical energy from said first guide means to said second guide means, and to couple a small portion of said optical energy to said third guide means.

42. The asymmetric fiber optic tap of claim 41, wherein said at least one HOE is adapted to optically couple at least 95% of the optical energy from said first guide means to said second guide means, and to couple 5% or less of said optical energy to said third guide means.

43. The asymmetric fiber optic tap of claim 35, wherein said at least one HOE is adapted to reflectively couple optical energy from said first guide means to said second guide means, and to reflectively couple optical energy from said optical source to said first guide means.

44. The fiber optic tap receiver of claim 43, further comprising an optical spacer in said housing and adjacent to said at least one HOE, and wherein said first and second guide means are adapted for guiding the ingoing and the outgoing fiber, respectively, adjacent to said optical spacer, and wherein said optical source is disposed adjacent to said optical spacer; said optical spacer being selected to maintain the ends of the ingoing and outgoing fiber and said optical source at predetermined distances from said HOE.

45. The asymmetric fiber optic tap of claim 44, wherein said housing further includes a third guide means therein, said third guide means being adapted for guiding an optical tap fiber adjacent said optical spacer; and wherein said at least one HOE is further adapted to reflectively couple optical energy from said first guide means to said third guide means.

46. The asymmetric fiber optic tap of claim 44, in combination with an ingoing fiber, and an outgoing fiber disposed in said first and second guide means, respectively.

47. The asymmetric fiber optic tap of claim 45, in combination with an ingoing fiber, an outgoing fiber and a tap fiber disposed in said first, second and third guide means, respectively.

48. The asymmetric fiber optic tap of claim 35 wherein said at least one HOE is adapted to couple optical energy from said first guide means to said second guide means by one of transmission and reflection and wherein said at least one HOE is adapted to couple optical energy from said optical source to said first guide means by one of transmission and reflection.

49. The asymmetric fiber optic tap of claim 35 wherein said housing further comprises third guide means therein, said third guide means being adapted for guiding the optical tap fiber to said at least one HOE; and wherein said at least one HOE is further adapted to couple optical energy from said first guide means to said third guide means by one of transmission and reflection.

50. The asymmetric fiber optic tap of claim 35, wherein said at least one HOE is further adapted to couple optical energy of a first wavelength from said first guide means to said second guide means, and to couple optical energy of a second wavelength from said optical source to said first guide means.

51. The asymmetric fiber optic tap of claim 38 or 45, wherein said at least one HOE is further adapted to couple optical energy of a first wavelength from said first guide means to both said second and third guide means, and to couple optical energy of a second wavelength from said optical source to said first guide means.

* * * * *

UNITED STATES PATENT OFFICE
CERTIFICATE OF CORRECTION

Patent No. 5,016,966      Dated May 21, 1991

Inventor(s) Terry P. Bowen and John R. Rowlette

It is certified that error appears in the above-identified patent and that said Letters Patent is hereby corrected as shown below:

In claim 1, column 6, line 45, the word "coupled" should be --couple--.

Signed and Sealed this

Thirteenth Day of October, 1992

Attest:

DOUGLAS B. COMER

*Attesting Officer*      *Acting Commissioner of Patents and Trademarks*